(12) United States Patent
Flanders et al.

(10) Patent No.: US 8,995,722 B2
(45) Date of Patent: Mar. 31, 2015

(54) SPARSE REDUCED (SPARE) FILTER

(71) Applicant: Raytheon Company, Waltham, MA (US)

(72) Inventors: Bradley A. Flanders, Whittier, CA (US); Ian S. Robinson, Redondo Beach, CA (US); Anthony M. Sommese, Northport, NY (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 13/959,335

(22) Filed: Aug. 5, 2013

(65) Prior Publication Data

US 2015/0036877 A1    Feb. 5, 2015

(51) Int. Cl.
*G06K 9/00*    (2006.01)
*G06K 9/40*    (2006.01)
*G06K 9/46*    (2006.01)

(52) U.S. Cl.
CPC .................................... *G06K 9/4609* (2013.01)
USPC .......................................... 382/103; 382/250

(58) Field of Classification Search
None
See application file for complete search history.

(56) References Cited

U.S. PATENT DOCUMENTS 5,384,853 A * 1/1995 Kinoshita et al. .......... 381/71.12
6,088,103 A * 7/2000 Everett et al. ................. 356/503

2008/0275349 A1 * 11/2008 Halperin et al. ............... 600/484
2010/0288910 A1 * 11/2010 Robinson et al. .......... 250/208.1
2010/0303371 A1    12/2010 Robinson et al.

FOREIGN PATENT DOCUMENTS

EP    2511680 A2    10/2012
EP    2597596 A2    5/2013

OTHER PUBLICATIONS

Comparison of hyperspectral sub pixel detection with and without a priori knowledge of target features , 1998 IEEE Robinson et al.*
Signal processing for hyperspectral image exploitation Shaw et al Jan. 2002.*

(Continued)

*Primary Examiner* — Nancy Bitar
(74) *Attorney, Agent, or Firm* — Burns & Levinson LLP; Joseph M. Maraia; Weber Hsiao

(57) ABSTRACT

The disclosure provides a filtering engine for selecting sparse filter components used to detect a material of interest (or specific target) in a hyperspectral imaging scene and applying the sparse filter to a plurality of pixels in the scene. The filtering engine transforms a spectral reference representing the material of interest to principal components space using the eigenvectors of the scene. It then ranks sparse filter components based on each transformed component of the spectral reference. The filtering engine selects sparse filter components based on their ranks. The filtering engine performs the subset selection quickly because the computations are minimized; it processes only the spectral reference vector and covariance matrix of the scene to do the subset selection rather than process a plurality of pixels in the scene, as is typically done. The spectral filter scores for the plurality of pixels are calculated efficiently using the sparse filter.

13 Claims, 4 Drawing Sheets

(56) References Cited

OTHER PUBLICATIONS

Manolakis, D. et al. "Is There a Best Hyperspectral Detection Algorithm?." Algorithms and Technologies for Multispectral, Hyperspectral, and Ultraspectral Imagery XV. Ed. Sylvia S. Shen & Paul E. Lewis. Orlando, FL, USA: SPIE, 2009. 733402-16 pages. © 2009 SPIE—The International Society for Optical Engineering.

Manolakis, et al., "Hyperspectral Image Processing for Automatic Target Detection Applications," The Lincoln Labroatory Journal, vol. 14, No. 1, 79-116, Jan. 1, 2013.

* cited by examiner

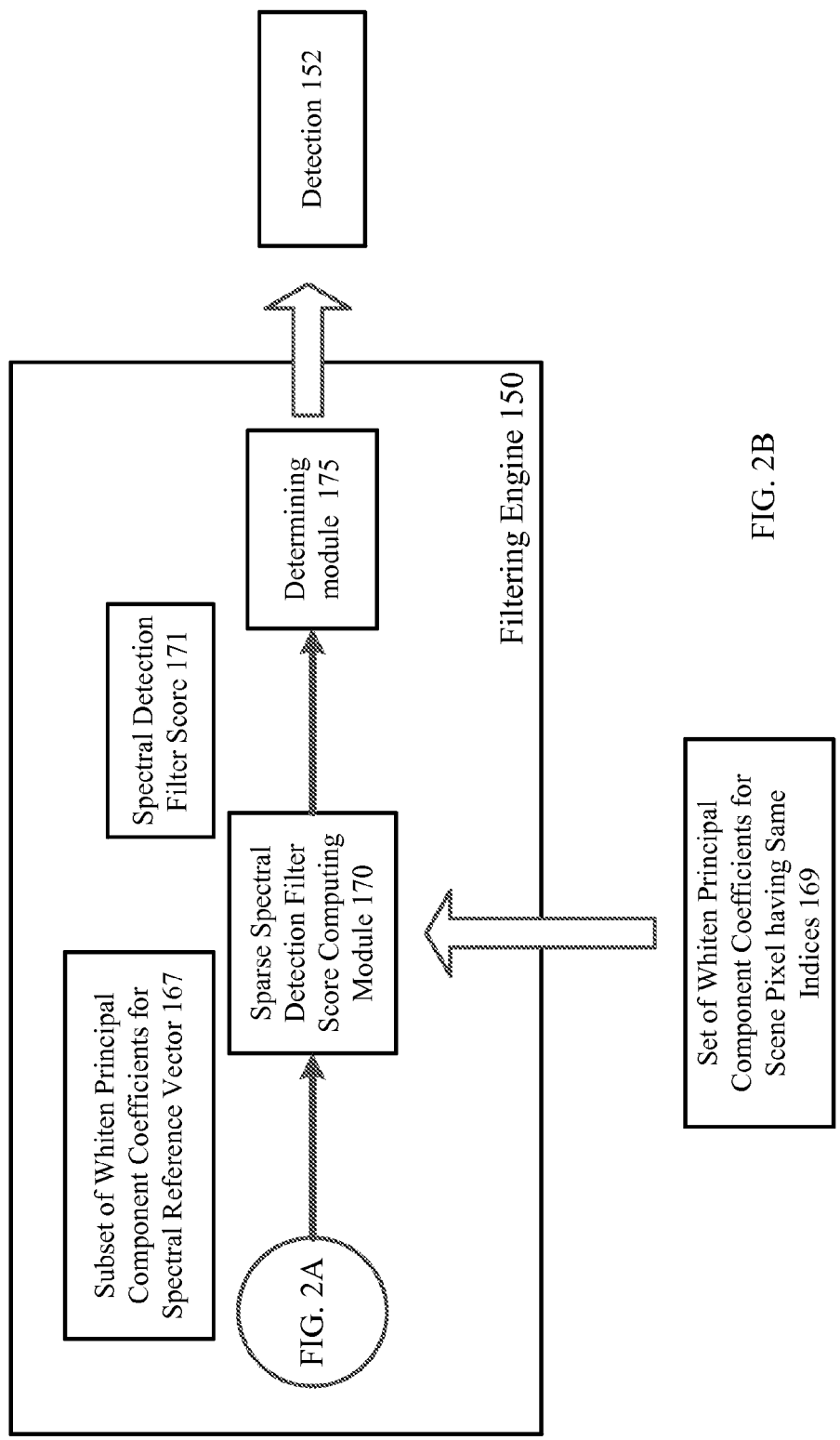

SPARSE REDUCED (SPARE) FILTER

BACKGROUND

This disclosure relates generally to the field of image processing, and more particularly to a system and a method for selecting a subset of hyperspectral imaging scene spectral covariance principal components to detect a material or target in a scene.

In many conventional image processing scenarios comprising hyperspectral imaging (HSI) systems, hyperspectral sensors collect data of an image from one spatial line and disperse the spectrum across a perpendicular direction of the focal plane of the optics receiving the image. Thus a focal plane pixel measures the intensity of a given spot on the ground in a specific waveband. A complete HSI cube scene is formed by scanning this spatial line across the scene that is imaged. The complete HSI cube may be analyzed as a measurement of the spectrum, the intensity in many wavebands, for a spatial pixel. This spatial pixel represents a given spot on the ground in a cross-scan direction for one of the lines at a given time in the scan direction. These spectra are analyzed to detect targets or spectral anomalies.

SUMMARY

Hyperspectral sensors collect hundreds of spectral bands per location (pixel) in a scene. The data for each pixel composes a vector of dimension D, were D is the number of wavelengths. Processing all this information to detect material(s) of interest or target(s) in a hyperspectral imaging scene (or scene) is very computationally intensive. The spectral data may be transformed to principal component coefficients (also referred as "principal components space," and "PC space") using the eigenvectors or "principal components" of the measured scene. This transformation generally has the affect of packing most of the information in the scene pixels into a minority of the principal components. As such, performing a pre-filtering process to select which principal components are useful, and then performing a detection process using the selected principal components, can reduce the amount of computing needed to find to a material of interest or target. In turn, a less powerful processor(s) can be used saving electricity, cost, and/or size, just to name a few benefits.

Which of the principal components in a full set of principal components is useful, however, changes from target to target and from scene to scene. Consider a real-world example of trying to look for a blue tarp in Southern California, which includes urban, suburban, rural, and desert scenes or backgrounds. The blue tarp can be found by detecting a particular contrast (i.e., signature) between the spectrum of the blue tarp and the spectrum of a background including the blue tarp. The contrast, however, differs for each combination of the blue tarp and respective background. For example, the blue tarp against an empty and uniform desert contrasts, hyperspectrally, different than against an urban background, which may include other blue-colored objects, such as a blue car or mailbox.

Accordingly, there is a need to dynamically select a subset of transformed components to use in HSI detection filters, in which the selection is adapted to each material of interest or specific target as viewed in each scene. Further, there is need to reduce the per scene pixel processing load of applying HSI detection filters to a plurality of scene pixels to determine in which of the scene pixels the material of interest or specific target is present.

A filtering engine according to some examples, described herein, addresses the foregoing need by transforming a spectral reference (of a target or material to be detected) into principal components space. In principal components space, the wavelength components are transformed to coefficients indicating the strength in the direction of the eigenvectors or "principal components" of a hyperspectral imaging scene. A convenient example of the filtering engine "whitens" the principal component coefficients of the spectral reference by dividing by the square root of the eigenvalue. The filtering engine ranks the whitened principal component coefficients of the spectral reference from largest to smallest, and selects a subset of the principal components based on the ranking. The same transform is applied to a plurality of scene pixels in the scene to determine in which of the scene pixels a material of interest or specific target is present.

Other examples of the filtering engine compute a sparse spectral detection filter for a spectral reference by saving the indices of selected R principal components and their whitened principal component coefficients within a vector of the spectral reference. These examples may be used to provide highly reduced dimension matched filter detection of HSI scene pixels transformed to principal components space.

A sparse spectral detection filter score is then calculated for each scene pixel in the plurality of scene pixels by computing a dot product of the selected R whitened principal component coefficients of the pixel spectrum with the corresponding whitened principal component coefficients of the reference spectrum at the same indices as the selected R principal components. Using a subset of components requires fewer calculations saving processing time and power. In some cases, the foregoing also saves battery life, and/or saves weight of a power system and cooling system, to name a few other advantages.

Advantageously, the filtering engine implements sparse spectral detection filters for L spectral references with each spectral reference being transformed to PC space and then its whitened coefficients being ranked. For each of the L spectral references, a sparse spectral detection filter calculation for a spectral reference requires D/R fewer operations than using the full dimension spectral detection filter. There is overhead to convert all the pixels to PC space so it is particularly advantageous to perform the above operations when L is large (e.g. greater than 50).

When L is a smaller than 50 another approach is applied. The first spectral reference is converted to PC space and its whitened coefficients are ranked. The largest R components are selected and the indices of the R components are retained. The PC coefficients for each pixel for only the R eigenvalues are computed. Next a matched filter score is computed using just the R components of the spectral reference and each pixel. It has been shown that for values of R between 10 and 20 the matched filter score is close to that achieved using a full dimension matched filter. If there is another target reference, it is converted to PC space and ranked and the indices of the R selected components are retained. The principal component values for each pixel for any new indices are computed. A matched filter score is computed using the second reference's R whitened coefficients and the like terms in each pixel. The process is repeated until all target references are tested or all pixel PC coefficients are computed. If the latter occurs the filtering engine defaults back selecting PC coefficients for any additional targets.

In contrast to the filtering engine and its examples, prior attempts to create a sparse detection filter require extensive searching for the "best" or "good enough" wavelength components. Such searching is computationally intensive and non-optimal. None of the prior attempts describe converting a spectral reference to a principal components space (or "whitened" space) and then selecting components in that space. None of the prior attempts describe, for example, selecting a subset of whitened principal component coefficients from a spectral reference and then applying them in a dot product with like components selected from a scene pixel.

The dynamic and adaptive approach of selecting transformed components based on each material of interest as viewed in each scene to use in HSI detection filters is contrasted with Principal Component Analysis (PCA) prior art. In PCA, one computes D scene eigenvectors and eigenvalues, where D is the number of wavelengths measured at each pixel. One then ranks and indexes the eigenvectors according to the size of the eigenvalues. The eigenvectors with the largest eigenvalues are the "principal components." Often all the measured pixels in the scene are unmixed with all the eigenvectors. Sometimes all the pixels are unmixed just with the eigenvectors with the largest N eigenvalues, where N is typically a number between 10 and 30. In PCA, this is all done independently of any target spectral reference vector.

In accordance with an example, a method for selecting a subset of hyperspectral imaging scene spectral covariance matrix principal components to detect a material of interest or specific target in a scene includes, in a filtering engine, provided with a set of whitened principal component coefficients of a spectral reference vector, the spectral reference vector representative of a material of interest or specific target, computing a signal-to-clutter ratio (SCR) of the spectral reference vector based on the set of whitened principal component coefficients of the spectral reference vector. The SCR measures the contrast of the material of interest or specific target as viewed in the scene and indicates the likelihood of detecting the material of interest or specific target in the scene. The method further includes ranking the contribution of each whitened principal component coefficient to the total SCR and selecting, based on the ranking, a subset of principal components from the full set of principal components. The method further includes selecting, based on the ranking, a subset of whitened principal component coefficients from the set of whitened principal component coefficients of the spectral reference vector. The method further includes, for each of a plurality of scene pixels in the scene, computing a sparse detection filter score for a subject scene pixel based on the selected subset of whitened principal component coefficients of the spectral reference vector and a respective subset of whitened principal component coefficients of the subject scene pixel having the same indices. The method further includes determining, based on the sparse detection filter score, whether the material of interest or specific target is present in the subject scene pixel.

In accordance with an example, a system for selecting a subset of hyperspectral imaging scene spectral covariance matrix principal components to detect a material of interest or specific target in a scene. The system includes a memory storing computer executable instructions and at least one interface receiving a set of whitened principal component coefficients of a spectral reference vector, the spectral reference vector representative of a material of interest or specific target. The system further includes a filtering engine coupled to the memory and the at least one interface. The computer executable instructions when executed by the filtering engine cause the filtering engine to compute a signal-to-clutter ratio (SCR) of the spectral reference vector based on the set of whitened principal component coefficients of the spectral reference vector. The SCR measures the contrast of the material of interest or specific target as viewed in the scene and indicates the likelihood of detecting the material of interest or specific target in the scene. The filtering engine is further caused to rank the contribution of each whitened principal component coefficient to the total SCR and select, based on rank, a subset of whitened principal component coefficients from the set of whitened principal component coefficients of the spectral reference vector. The filtering engine is further caused to for each of a plurality of scene pixels in the scene, compute a sparse detection filter score for a subject scene pixel based on the selected subset of whitened principal component coefficients of the spectral reference vector and a respective subset of whitened principal component coefficients of the subject scene pixel having the same indices. The filtering engine is further caused to determine, based on the sparse detection filter score, whether the material of interest or specific target is present in the subject scene pixel.

In accordance with an example, a tangible computer-readable storage medium storing computer readable instructions for selecting a subset of hyperspectral imaging scene spectral covariance matrix principal components to detect a material of interest or specific target in a scene. The tangible computer-readable storage medium, which when executed by one or more processors provided with a set of whitened principal component coefficients of a spectral reference vector, the spectral reference vector representative of a material of interest or specific target, compute a signal-to-clutter ratio (SCR) of the spectral reference vector based on the set of whitened principal component coefficients of the spectral reference vector. The SCR measures the contrast of the material of interest or specific target as viewed in the scene and indicates the likelihood of detecting the material of interest or specific target in the scene. The one or more processors is further caused to rank the contribution of each whitened principal component coefficient to the total SCR. The one or more processors are further caused to select, based on rank, a subset of whitened principal component coefficients from the set of whitened principal component coefficients of the spectral reference vector. The one or more processors are further caused to, or each of a plurality of scene pixels in the scene, compute a sparse detection filter score for a subject scene pixel based on the selected subset of whitened principal component coefficients of the spectral reference vector and a respective subset of whitened principal component coefficients of the subject scene pixel having the same indices. The one or more processors are further caused to determine, based on the sparse detection filter score, whether the material of interest or specific target is present in the subject scene pixel.

In some examples of the method, selecting the subset of whitened principal component coefficients includes selecting a set of whitened principal component coefficients of the spectral reference vector having a cumulative SCR contribution above a threshold.

In other examples of the method, selecting the subset of whitened principal component coefficients includes selecting a set of whitened principal component coefficients of the spectral reference vector having a SCR contribution above a threshold percentage of the total SCR.

In some examples of the method, computing the sparse detection filter scores includes computing the dot product of the selected subset of whitened principal component coefficients of the spectral reference vector with the respective subset of whitened principal component coefficients of the subject scene pixel having the same indices.

In other examples of the method, wherein scene pixels determined to have the material of interest or specific target present are initial detections. The examples of the method further include computing full dimension matched filter (MF), Adaptive Cosine/Coherence Estimator (ACE) or other spectral detection filter scores for verifying the initial detections, and determining, based on the full dimension matched filter (MF), Adaptive Cosine/Coherence Estimator (ACE) or other spectral detection filter scores, in which of the initial detections is the material of interest or specific target present.

Some examples of the method further include comparing the sparse detection filter scores to a threshold. The examples of the method further include selecting scene pixels from the plurality of scene pixels based on the comparison and computing a modified detection filter score for each of the selected scene pixels based on a local spectral covariance in the vicinity of the material of interest or specific target. The examples of the method further include determining, based on the modified detection filter scores, in which of the selected scene pixels is the material of interest or specific target present.

In other examples of the method, given M whitened principal component coefficients selected for the spectral reference vector, and wherein the subject scene pixel includes a plurality of principal components and all the principal components of the plurality have been unmixed from the subject scene pixel and whitened, the method includes from the plurality, selecting whitened principal component coefficients of the subject scene pixel having the same indices as the whitened principal component coefficients of the spectral reference vector based on the M whitened principal component coefficients selected for the spectral reference vector.

In some examples of the method, given M whitened principal component coefficients selected for the spectral reference vector and M principal components from which the coefficients are computed, and given a set of zero or more previously unmixed whitened principal component coefficients for the subject scene pixel, the method includes, from the set, selecting previously unmixed whitened principal component coefficients having the same indices as the whitened principal component coefficients selected for the spectral reference vector, based on the M whitened principal component coefficients. The method further includes, for each coefficient of the M whitened principal component coefficients having an index different than the indices of the previously unmixed whitened principal component coefficients, unmixing a principal component, which is associated with that coefficient, from the subject scene pixel resulting in a newly unmixed whitened principal component coefficient for the subject scene pixel. The method further includes wherein computing the sparse detection filter score includes computing the sparse detection filter score for the subject scene pixel using the previously and newly unmixed whitened principal component coefficients having the same indices as the M whitened principal component coefficients selected for the spectral reference vector.

Other examples of the method include, for the subject scene pixel, recording the newly unmixed whitened principal components coefficients with the previously unmixed whitened principal components coefficients.

Some examples of the method include, given M' whitened principal component coefficients selected for a second spectral reference vector and M' principal components from which the coefficients are computed, from the set, selecting previously unmixed whitened principal component coefficients having the same indices as the whitened principal component coefficients selected for the second spectral reference vector, based on the M' whitened principal component coefficients. The method further includes, for each coefficient of the 'M whitened principal component coefficients having an index different than the indices of the previously unmixed whitened principal component coefficients, unmixing a principal component, which is associated with that coefficient, from the subject scene pixel resulting in a newly unmixed whitened principal component coefficient for the subject scene pixel. The method further includes, with respect to the second spectral reference vector, computing a sparse detection filter score for the subject scene pixel using the previously and newly unmixed whitened principal component coefficients having the same indices as the M' whitened principal component coefficients selected for the second spectral reference vector.

These and other features and characteristics, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various Figures. It is to be expressly understood, however, that the drawings are for the purpose of illustration and description only and are not intended as a definition of the limits of claims. As used in the specification and in the claims, the singular form of "a", "an", and "the" include plural referents unless the context clearly dictates otherwise.

BRIEF DESCRIPTION OF THE DRAWINGS

The foregoing and other objects, features and advantages will be apparent from the following more particular description of the examples, as illustrated in the accompanying drawings in which like reference characters refer to the same parts throughout the different views. The drawings are not necessarily to scale, emphasis instead being placed upon illustrating the principals of the embodiments.

FIGS. 2A-2B is a block diagram of an example of the filtering engine.

DETAILED DESCRIPTION

Figure 1:
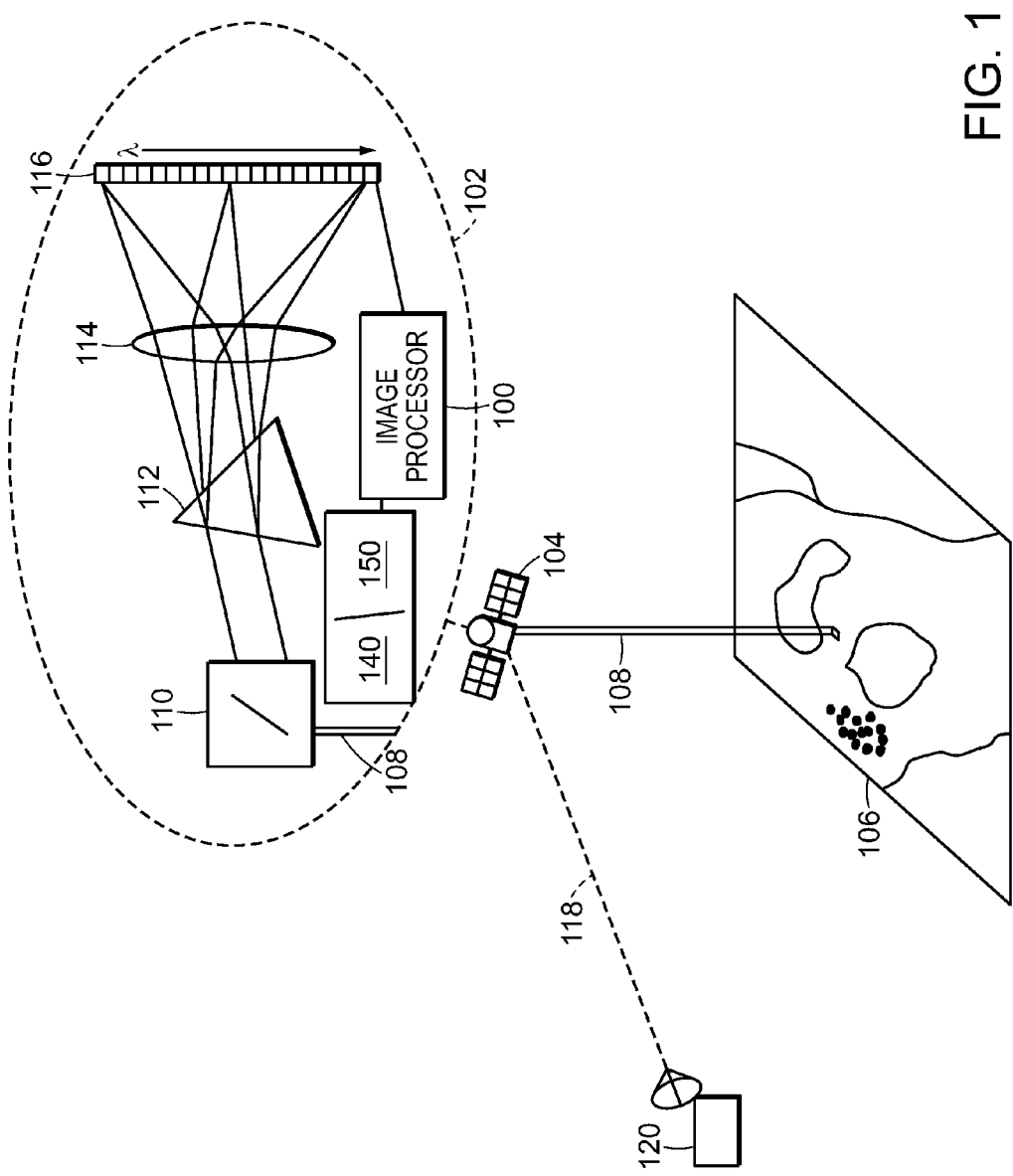
FIG. 1 is a block diagram of an example imaging system with a filtering engine.

In the description that follows, like components have been given the same reference numerals, regardless of whether they are shown in different examples. To illustrate an example(s) of the present disclosure in a clear and concise manner, the drawings may not necessarily be to scale and certain features may be shown in somewhat schematic form. Features that are described and/or illustrated with respect to one example may be used in the same way or in a similar way in one or more other examples and/or in combination with or instead of the features of the other examples.

Depicted in FIG. 1 is an example of imaging system 102 that is configured to process images and to detect materials/targets in backgrounds/scenes. By way of example only, imaging system 102 may be a hyperspectral imaging system. The term "hyperspectral" refers to imaging narrow spectral bands over a continuous spectral range, and producing the spectra of all scene pixels in a scene (e.g., scene 106). Imaging system 102 may be stationary or mobile, airborne or land based (e.g., on an elevated land structure or building), or may be on an aircraft or a satellite. As shown, imaging system 102 may incorporate image processor 100, and may be coupled to or otherwise contained within remote imaging system 104. Remote imaging system 104 may be of any suitable construction or configuration, including but not limited to comprising a satellite, an aerial surveillance system, or any other system that can capture images. Additionally, remote imaging system 104 may be stationary or mobile. In an example, imaging system 102 and remote imaging system 104 may be configured to capture one or more images of a particular scene 106 corresponding to a geographical area (e.g., a ground terrain).

In an example, remote imaging system 104 may be configured to use imaging system 102 to capture hyperspectral image(s) of scene 106 that are provided as input hyperspectral image (HSI) scenes to image processor 100. In an example, hyperspectral imaging system 102 may include one or more scan mirrors 110, or may include other optics arranged to receive light 108 reflected from one or more ground resolution cells. Light 108 reflected from one or more ground resolution cells, and generally the entire scene 106, may be used by image processor 100 to determine an input reflectivity of input HSI scene. Input HSI scene may be a part of scene 106, or may be the entire scene 106 depending upon specific target detection goals. In an example, scan mirrors 110 or the other optics may then direct light 108 through dispersing element 112, which may be arranged to separate light 108 into various different wavelengths (i.e., a spectra). After being separated into the various different wavelengths, light 108 may then be directed to one or more imaging optics 114, which may focus the various wavelengths onto a focal plane of detector array 116. As such, detector array 116 may capture hyperspectral data across the spectrum of wavelengths, thereby generating a data set corresponding to a hyperspectral image of scene 106.

As shown, the imaging system 102 includes a detecting engine 140 for detecting a target in a scene, such as a material of interest or target against a background. HSI sensors typically collect 200-400 narrow spectral bands over a given sensing regime (e.g., visible and near infra-red (VNIR)/short wave infrared (SWIR) and long wave infrared (LWIR)). This represents a HSI sensor generating hundreds of megabits of data each second. Prototype HSI sensors increase the data rate by ten to twenty times. It may not be practical for the detecting engine 140 to process this amount of information, especially when the detecting engine 140 is located "on-board" the remote imaging system 104, as shown in the figure. It may also not be practical to process this amount of information "on-ground." Ground stations are not able to process total daily collections in excess of several terabytes per day.

A given material of interest or target viewed in a specific background can be detected using 10-20 principal components (there are D principal components for a scene with D wavelengths); typically 150-480 wavelengths are collected. These 10-20 transformed principal component coefficients often contain 60-95% of the useful information. But a different set of components may be needed for each target and the principal components space is unique to each scene. Accordingly, the imaging system 102 further includes a filtering engine 150. The filtering engine 150 selects subsets of hyperspectral imaging scene spectral covariance principal components having information useful for detecting materials of interest or targets in each scene. These informative principal components are components of a "sparse detection filter."

Figure 2A:
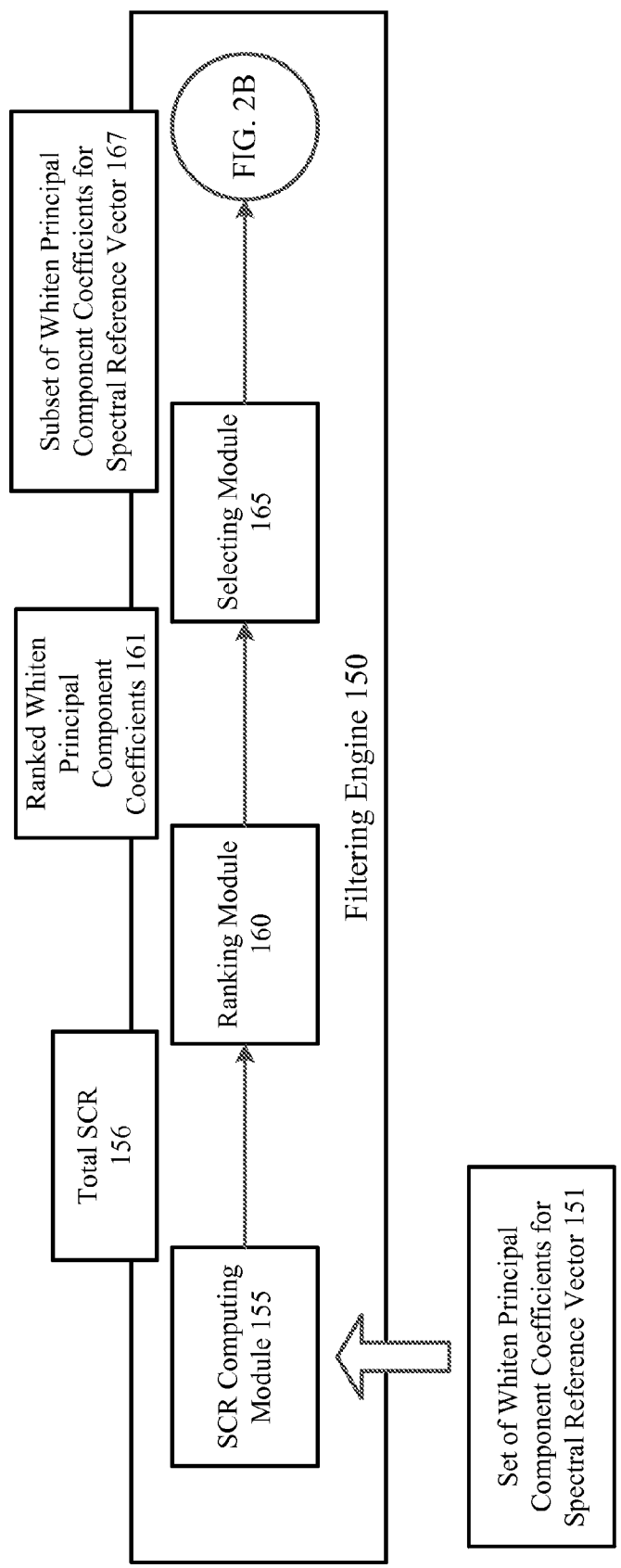

FIGS. 2A and 2B show an example of the filtering engine 150. The filtering engine 150 includes a signal-to-clutter ratio (SCR) computing module 155, ranking module 160, selecting module 165, sparse spectral detection filter score computing module 170, and a determining module 175 commutatively coupled to one another as shown. Input to the filtering engine 150 includes a set of whitened principal component coefficients of a spectral reference vector (target) 151. The spectral reference vector is representative of a material of interest or specific target.

The principal components (or eigenvectors) of the scene are found by eigenvector decomposition of the scene spectral covariance matrix. The principal component transformation is specific to each scene and its respective spectral covariance matrix. The eigenvector decomposition is a standard technique in HSI analysis. If there are D number of wavelengths for each scene pixel, then there are D number of principal components. The spectral reference vector 152 is transformed to whitened principal component space by unmixing the spectral reference with all the principal components of the scene and weighting the resulting coefficients with the square root of 1/eigenvalue.

The SCR computing module 155 computes a signal-to-clutter ratio (SCR) of the spectral reference vector based on the set of whitened principal component coefficients 151. The SCR measures the contrast of the material of interest or specific target as viewed in the scene whose spectral covariance matrix is used to compute the set of whitened principal component coefficients 151. The SCR also indicates the likelihood of detecting the material of interest or specific target in that scene.

In a convenient example of the filtering engine 150, the SCR computing module 155 computes a total SCR 156 as a root sum of squares (RSS) of the whitened principal component coefficients of the target reference spectrum 151. In the context of the foregoing example of the filtering engine 150, by computing the SCR as an RSS, each contribution (or contribution SCR) to the total SCR 156 is either a zero or a positive value. As such, no SCR contribution will reduce the value of the total SCR 156. This is advantageous because it makes the next step of ranking the contribution SCRs a straightforward and efficient process.

The ranking module 160 ranks the SCR contribution of each principal component coefficient to the total SCR 156. The result of the ranking are ranked whitened principal component coefficients 161 and their associated indices. For example, the ranking module 160 orders the whitened principal component coefficients from highest to lowest in terms of SCR contribution to the total SCR 156. The filtering engine 150 finds the "best" whitened principal component coefficients or "best subset" of whitened principal component coefficients (e.g., the coefficients with the 10 largest contributions) by ranking the whitened principal component coefficients of the reference spectrum.

Ranking the principal component coefficients is advantageous because principal component coefficients are uncorrelated components that aggregate the information indicating contrast and detectability into a small number of terms. They are quickly ranked using simple sorting routines. Ranking principal component coefficients is contrasted with searching over wavebands for the "best" waveband. Wavebands are correlated components and, in practice, insufficient computational resources exist to find a best set of wavebands, thus only a "good enough" subset of wavebands can be found. Compared to searching for a "good enough" subset of wavebands, ranking principal components to determine the best or the best subset is computationally less intensive. Furthermore, there is a performance advantage because the filtering engine 150 can guarantee the best or the best subset rather than a "good enough" subset or any other sub-optimal or adequate subset.

The selecting module 165 selects, based on rank, a subset of whitened principal component coefficients 167 from the set of principal component coefficients of the spectral reference vector 151. A convenient example of the selecting module 165 drops principal components with the smallest coefficients in the spectral reference vector until either a specified number (e.g. 10) of principal components with the largest contributions remain or until the RSS of the remaining whitened principal component coefficients reaches a specified fraction of the total (initial) SCR value.

The filtering engine 150 repeats the foregoing with each of L spectral reference vector. In general, the filtering engine 150 selects some different whitened principal component coefficients for each of the L spectral references. Ultimately, C principal component vectors are unmixed, where C is the union of all principal components needed to represent materials of interest or specific targets; and C is less than or equal to D wavebands. This is advantageous because the number of operations taken by the filtering engine 150 scales very efficiently with the number of spectral references (L).

The filtering engine 150 advantageously adapts components for each spectral reference vector as viewed in each scene. The filtering engine 150 identifies a subset of components with the greatest contrast between a material of interest (or specific target) and a specific background being observed. As such, the filter component selection is dynamic and tailored to each target and each scene. This improves performance compared to similarly efficient and fast but non-adaptive approaches.

The sparse spectral detection filter score computing module 170 computes a sparse spectral detection filter score for each of a plurality of scene pixel in a scene. Given a subject scene pixel, the sparse spectral detection filter score computing module 170 computes a sparse spectral detection filter score 171 for the subject scene pixel based on the selected subset of whitened principal component coefficients of the spectral reference vector 167 and subset of whitened principal component coefficients of the subject scene pixel having the same indices 169. The indices indentify which principal components (eigenvectors) were used to compute the selected whitened principal component coefficients of the spectral reference vector. Using the indices, the filtering engine 150 selects principal component coefficients of the subject scene pixel from a plurality of principal component coefficients or, in some cases, selectively unmixes (converts or transforms) the subject scene pixel into principal component coefficients. Whether selected or selectively unmixed, these coefficients may be referred to as a "like" subset of whitened principal component coefficients. Further, these coefficients may be said to like the whitened principal component coefficients selected for the spectral reference vector.

Consider the following example cases in which the filtering engine 150 selects 10 whitened principal component coefficients of a spectral reference vector (e.g., 10 largest contributors to the total SCR). In the case where the subject scene pixel includes a plurality of principal components and all of them have been unmixed from the subject scene pixel and whitened, the filtering engine 150 selects 10 whitened principal component coefficients from the plurality having the same indices as the 10 whitened principal component coefficients of the spectral reference vector.

The filtering engine 150 computes spectral detection scores for the subject scene pixel based on the selected 10 whitened principal component coefficients of the spectral reference vector and the like subset of 10 whitened principal component coefficients of the subject scene pixel. For a given scene pixel, the filtering engine 150 may test for several targets (spectral reference vectors). For each of the targets, the filtering engine 150 selects a different set of whitened principal component coefficients for the target and scene pixel.

In the case where there is a set of zero or more previously unmixed whitened principal component coefficients for the subject scene pixel, a convenient example of the filtering engine 150 uses the indices associated with a set of whitened principal component coefficients selected for a spectral reference vector to convert the subject scene pixel into coefficients, selectively. Based on the indices of the selected set of coefficients, the filtering engine 150 unmixes principal components corresponding to the selected set from the subject scene pixel. This selective conversion process is advantageous because the filtering engine 150 computes coefficients of scene pixels using part of a larger set (e.g., full set) of principal components. Because unmixing is computationally intensive process, it is beneficial to reduce the number of principal components to unmix from a scene pixel Again, for the purpose of explaining, assume the filtering engine 150 selects 10 whitened principal component coefficients for a first spectral reference vector. The filtering engine 150 unmixes, from the subject scene pixel, 10 principal components corresponding to the selected 10 whitened principal component coefficients, resulting in 10 coefficients for the subject scene pixel. The filtering engine 150 whitens the coefficients into 10 whitened principal component coefficients for the subject scene pixel.

The filtering engine 150 continues by finding the R top principal components for a second spectral reference vector. The filtering engine 150 unmixes additional principal components from the subject scene pixel when any of the indices are different than from the ones used to transform the subject scene pixel for the first spectral reference vector. For each successive spectral reference vector (e.g., third, fourth, etc.), the filtering engine 150 unmixes additional "new" principal components. This saves significant overhead by requiring PRD operations to partially transform scene pixels. At worst, the filtering engine 150 computes all transform coefficients for the scene pixels requiring $PD^2$ operations.

For the subject scene pixel, the filtering engine 150 computes a dot product of R whitened principal component coefficients with whitened principal component coefficients from the subject scene pixel having the same indices (selected or selectively unmixed). (One example of the filtering engine 150 stores the dot product for future use.) One of the advantages to applying a sparse spectral detection filter for a spectral reference vector as a dot product of a subset of transformed reference components and like components of each scene pixel is that the number of operations taken by the filtering engine 150 to compute the sparse spectral detection filter for the spectral reference vector is reduced by D/R (or D/10 in this example). This saves processing time and power. In some cases, it also saves battery life, and/or saves weight of a power system and cooling system, to name a few other advantages.

The determining module 175 (or a detecting engine, such as the detecting engine 140 of FIG. 1) determines the presence of the material of interest or specific target in the given scene pixel by comparing the sparse spectral detection filter score 171 to a threshold, also referred to as "thresholding." As result of thresholding, the filtering engine 150 provides a detection 152. In some examples, the threshold (and any threshold described herein) can be provided, for example, during initialization. The threshold can be read from a configuration file, obtained by user input (e.g., using the front end interface described with reference to FIG. 1), determined from one or more features of the image, and combinations of one or more of such techniques. The magnitude of threshold is selected to ensure the vast majority of pixels containing targets are above threshold and very few other pixels are above the threshold.

Other examples of the filtering engine 150 use the sparse spectral detection filter scores 171 to determine which scene pixels should be re-tested using full dimension (i.e., full waveband) Matched Filter (MF), Adaptive Cosine/Coherence Estimator (ACE) or other spectral detection filter. The filtering engine 150 scores these scene pixels using the full dimension MF, ACE or other spectral detection filter. This is advantageous because applying a full dimensional spectral detection filter on a subset of scene pixels, viz., those scene pixels with medium detection filter scores, rather than on a complete set of scene pixels, reduces the number of operations. It may be convenient to refer to the foregoing examples of the filtering engine 150 as performing two stage processing using sparse filters followed by full or less sparse detection filters using selected candidate detections.

Still other examples of the filtering engine 150 use the sparse spectral detection filter scores 171 to determine whether to compute a modified detection filter score using a local spectral covariance within the vicinity of a material of interest or specific target. As in the examples above, the filtering engine 150 "reprocesses" scene pixels with medium detection filter scores. Use of the modified score is advantageous because the local spectral covariance can be a more appropriate measure of background than the full scene spectral covariance. Use of reduced dimensions is further advantageous because it is often numerically unstable to compute a local spectral covariance using full dimensions. It may be convenient to refer to the foregoing examples of the filtering engine 150 as performing two stage processing using sparse detection filters followed by local spectral covariance processing on selected candidate detections.

In addition to the filtering engine 150 and its examples, principal component coefficients are used in a variety of hyperspectral imaging processes that are frequently executed by users of hyperspectral imaging data. Often, a filtering engine will detect those pixels whose spectrum is different from the typical spectrum in the scene. A well known technique to detect these spectral anomalies is the RX (Reed-Xiaoli) anomaly detection filter. One method to compute the RX filter score is to whiten each pixel then compute the dot product of each pixel with itself as the result. There are other methods to detect anomalies that require computation of principal components. By leveraging these processes and using data already transformed into whitened or principal components space, the filtering engine 150 can advantageously form sparse detection filters of low dimensionality that are unique to each material or interest or specific target in each scene and incur no additional overhead of operations.

Figure 3:
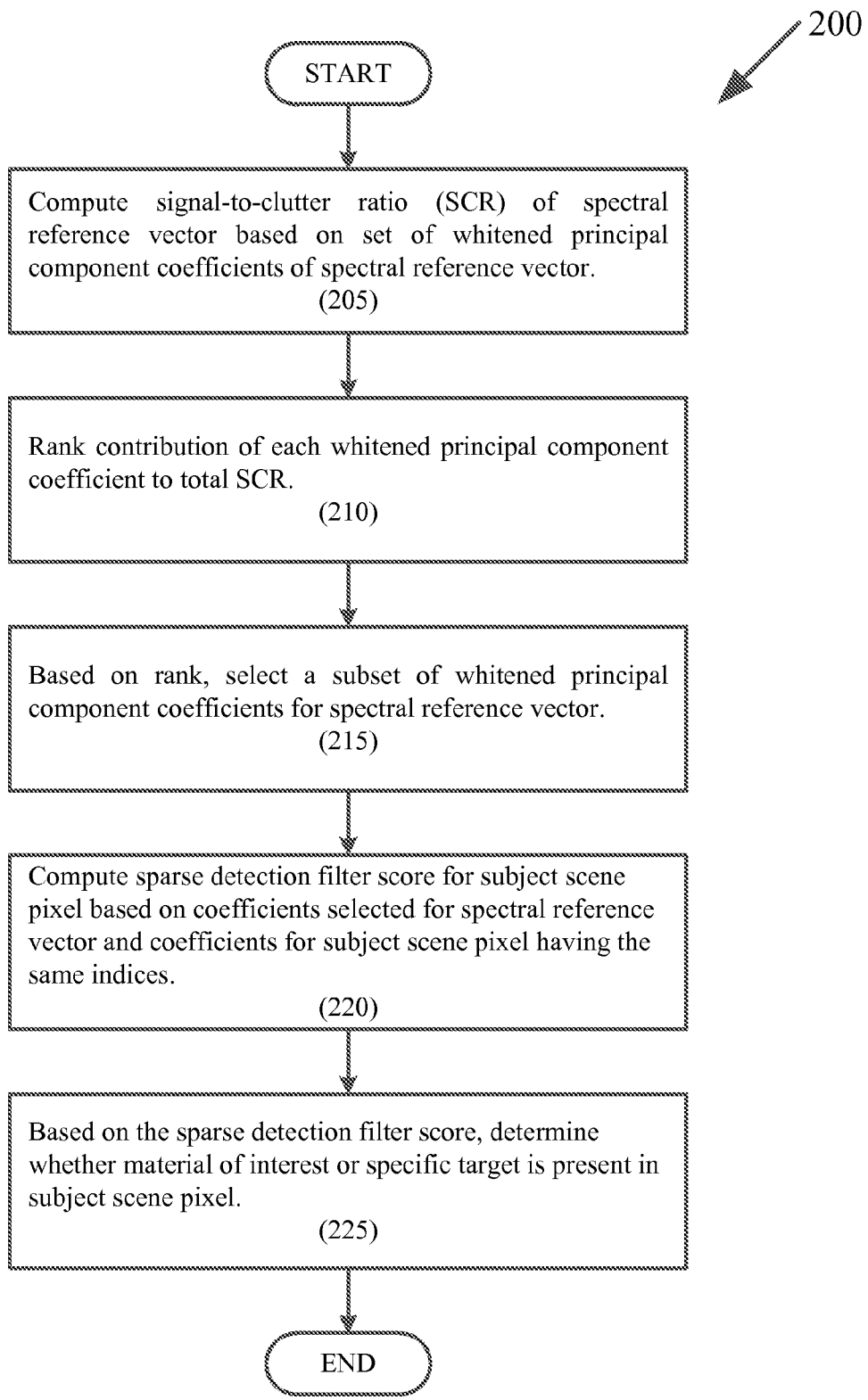
FIG. 3 is a flow chart of an example procedure performed by the filtering engine.

FIG. 3 shows an example procedure 200 for selecting a subset of hyperspectral imaging scene spectral covariance principal components to detect a material of interest or specific target in a scene. The procedure 200 is performed by the filtering engine 150. The filtering engine 150 is provided with a set of whitened principal component coefficients of a spectral reference vector.

The procedure 200 computes (205) a signal-to-clutter ratio (SCR) of the spectral reference vector based on the set of whitened principal component coefficients of the spectral reference vector.

The procedure 200 ranks (210) the contribution of each whitened principal component coefficient to the total SCR. The procedure 200 selects (215), based on the ranking, a subset of whitened principal component coefficients from the set of whitened principal component coefficients of the spectral reference vector. The procedure 200, for each of a plurality of scene pixels in the scene, computes (220) a sparse detection filter score for a subject scene pixel based on the selected subset of whitened principal component coefficients of the spectral reference vector and a respective subset of whitened principal component coefficients of the subject scene pixel having the same indices.

The procedure 200 determines (225), based on the sparse detection filter score, whether the material of interest or specific target is present in the subject scene pixel. The procedure 200 repeats the foregoing steps (205-225) for each spectral reference. In general, the procedure 200 selects a different set of whitened principal component coefficients for each spectral reference.

The above-described systems and methods can be implemented in digital electronic circuitry, in computer hardware, firmware, and/or software, e.g., in imaging system 102. The implementation can be as a computer program product (i.e., a computer program tangibly embodied in an information carrier medium). The implementation can, for example, be in a machine-readable storage device for execution by, or to control the operation of, data processing apparatus. The implementation can, for example, be a programmable processor, a computer, and/or multiple computers.

In one example, a computer program can be written in any form of programming language, including compiled and/or interpreted languages, and the computer program can be deployed in any form, including as a stand-alone program or as a subroutine, element, and/or other unit in image processor 100 suitable for use in a computing environment to carry out the features and functions of various examples discussed herein. A computer program can be deployed to be executed on one computer or on multiple computers at one site (e.g., in imaging system 102).

Method steps or operations can be performed as processes by one or more programmable processors executing a computer program to perform functions of various examples by operating on input data and generating output. Method steps can also be performed by and an apparatus can be implemented as special purpose logic circuitry. The circuitry can, for example, be a field programmable gate array (FPGA) and/or an application specific integrated circuit (ASIC). Modules, subroutines, and software agents can refer to portions of the computer program, the processor, the special circuitry, software, and/or hardware that implements that functionality.

Filtering engine 150 may comprise one or more processors suitable for the execution of a computer program include, by way of example, both general and special purpose microprocessors, and any one or more processors of any kind of digital computer. Generally, a processor receives instructions and data from a read-only memory or a random access memory or both. The elements of a computer may comprise a processor for executing instructions and one or more memory devices for storing instructions and data. Generally, a computer can include, can be operatively coupled to receive data from and/or transfer data to one or more mass storage devices (e.g., a memory module) for storing data (e.g., magnetic, magneto-optical disks, or optical disks). The memory may be a tangible non-transitory computer-readable storage medium having computer-readable instructions stored therein for processing images, which when executed by one or more processors (e.g., filtering engine 150) cause the one or more processors to carry out or implement the features and functionalities of various examples discussed herein.

Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computing device having a display device. The display device can, for example, be a cathode ray tube (CRT) and/or a liquid crystal display (LCD) monitor, and/or a light emitting diode (LED) monitor. The interaction with a user can, for example, be a display of information to the user and a keyboard and a pointing device (e.g., a mouse or a trackball) by which the user can provide input to the computing device (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described systems and techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computing device having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system may be coupled to and/or include clients and servers. A client and a server are generally remote from each other and typically interact through a communication network. The relationship of client and server arises by virtue of computer programs running on the respective computing devices and having a client-server relationship to each other.

Communication networks may include packet-based networks, which can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks may include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The computing device in imaging system 102 may include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a World Wide Web browser (e.g., INTERNET EXPLORER® available from Microsoft Corporation, of Redmond, Wash.). The mobile computing device includes, for example, a BLACKBERRY® provided by Research In Motion Limited of Waterloo, Ontario, Canada.

"Comprise," "include," and/or plural forms of each are open ended and include the listed parts and can include additional parts that are not listed. "And/or" is open ended and includes one or more of the listed parts and combinations of the listed parts.

Although the above disclosure discusses what is currently considered to be a variety of useful examples, it is to be understood that such detail is solely for that purpose, and that the appended claims are not limited to the disclosed examples, but, on the contrary, are intended to cover modifications and equivalent arrangements that are within the spirit and scope of the appended claims.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A method for selecting a subset of hyperspectral imaging scene spectral covariance matrix principal components to detect a material of interest or specific target in a scene, the method comprising:

in a filtering engine provided with a set of whitened principal component coefficients of a spectral reference vector, the spectral reference vector representative of a material of interest or specific target:
computing a signal-to-clutter ratio (SCR) of the spectral reference vector based on the set of whitened principal component coefficients of the spectral reference vector;
ranking the contribution of each whitened principal component coefficient to the total SCR;
selecting, based on the ranking, a subset of whitened principal component coefficients from the set of whitened principal component coefficients of the spectral reference vector;
for each of a plurality of scene pixels in the scene, computing a sparse detection filter score for a subject scene pixel based on the selected subset of whitened principal component coefficients of the spectral reference vector and a respective subset of whitened principal component coefficients of the subject scene pixel having the same indices; and
determining, based on the sparse detection filter score, whether the material of interest or specific target is present in the subject scene pixel.

2. The method of claim 1 wherein selecting the subset of whitened principal component coefficients includes selecting a set of whitened principal component coefficients of the spectral reference vector having a cumulative SCR contribution above a threshold.

3. The method of claim 1 wherein selecting the subset of whitened principal component coefficients includes selecting a set of whitened principal component coefficients of the spectral reference vector having a SCR contribution above a threshold percentage of the total SCR.

4. The method of claim 1 wherein computing the sparse detection filter score for the subject scene pixel includes computing the dot product of the selected subset of whitened principal component coefficients of the spectral reference vector with the respective subset of whitened principal component coefficients of the subject scene pixel having the same indices.

5. The method of claim 1 wherein determining whether the material of interest or specific target is present in the subject scene pixel includes:
   comparing the sparse detection filter score for the subject scene pixel to a threshold; and
   determining the presence of the material of interest or specific target in the subject scene pixel based on the comparison.

6. The method of claim 5 wherein scene pixels determined to have the material of interest or specific target present are initial detections, the method further comprising:
   computing full dimension matched filter (MF), Adaptive Cosine/Coherence Estimator (ACE) or other spectral detection filter scores for verifying the initial detections; and
   determining, based on the full dimension matched filter (MF), Adaptive Cosine/Coherence Estimator (ACE) or other spectral detection filter scores, in which of the initial detections is the material of interest or specific target present.

7. The method of claim 1 further comprising:
   comparing the sparse detection filter scores to a threshold;
   selecting scene pixels from the plurality of scene pixels based on the comparison;
   computing a modified detection filter score for each of the selected scene pixels based on a local spectral covariance in the vicinity of the material of interest or specific target; and
   determining, based on the modified detection filter scores, in which of the selected scene pixels is the material of interest or specific target present.

8. The method of claim 1, given M whitened principal component coefficients selected for the spectral reference vector, and wherein the subject scene pixel includes a plurality of principal components and all the principal components of the plurality have been unmixed from the subject scene pixel and whitened, the method further comprising:
   from the plurality, selecting whitened principal component coefficients of the subject scene pixel having the same indices as the whitened principal component coefficients of the spectral reference vector based on the M whitened principal component coefficients selected for the spectral reference vector.

9. The method of claim 1, given M whitened principal component coefficients selected for the spectral reference vector and M principal components from which the coefficients are computed, and given a set of zero or more previously unmixed whitened principal component coefficients for the subject scene pixel, the method further comprising:
   from the set, selecting previously unmixed whitened principal component coefficients having the same indices as the whitened principal component coefficients selected for the spectral reference vector, based on the M whitened principal component coefficients;
   for each coefficient of the M whitened principal component coefficients having an index different than the indices of the previously unmixed whitened principal component coefficients, unmixing a principal component, which is associated with that coefficient, from the subject scene pixel resulting in a newly unmixed whitened principal component coefficient for the subject scene pixel; and
   wherein computing the sparse detection filter score includes computing the sparse detection filter score for the subject scene pixel using the previously and newly unmixed whitened principal component coefficients having the same indices as the M whitened principal component coefficients selected for the spectral reference vector.

10. The method of claim 9 further comprising for the subject scene pixel, recording the newly unmixed whitened principal components coefficients with the previously unmixed whitened principal components coefficients.

11. The method of claim 9, given M' whitened principal component coefficients selected for a second spectral reference vector and M' principal components from which the coefficients are computed, the method further comprising:
   from the set, selecting previously unmixed whitened principal component coefficients having the same indices as the whitened principal component coefficients selected for the second spectral reference vector, based on the M' whitened principal component coefficients;
   for each coefficient of the 'M whitened principal component coefficients having an index different than the indices of the previously unmixed whitened principal component coefficients, unmixing a principal component, which is associated with that coefficient, from the subject scene pixel resulting in a newly unmixed whitened principal component coefficient for the subject scene pixel; and
   with respect to the second spectral reference vector, computing a sparse detection filter score for the subject scene pixel using the previously and newly unmixed whitened principal component coefficients having the same indices as the M' whitened principal component coefficients selected for the second spectral reference vector.

12. A system for selecting a subset of hyperspectral imaging scene spectral covariance matrix principal components to detect a material of interest or specific target in a scene, the system comprising:
   a memory having computer executable instructions thereupon;
   at least one interface receiving a set of whitened principal component coefficients of a spectral reference vector, the spectral reference vector representative of a material of interest or specific target;
   a filtering engine coupled to the memory and the at least one interface, the computer executable instructions when executed by the filtering engine cause the filtering engine to:
   compute a signal-to-clutter ratio (SCR) of the spectral reference vector based on the set of whitened principal component coefficients of the spectral reference vector;
   rank the contribution of each whitened principal component coefficient to the total SCR;
   select, based on rank, a subset of whitened principal component coefficients from the set of whitened principal component coefficients of the spectral reference vector; and
   for each of a plurality of scene pixels in the scene, compute a sparse detection filter score for a subject scene pixel based on the selected subset of whitened principal component coefficients of the spectral reference vector and a respective subset of whitened principal component coefficients of the subject scene pixel having the same indices; and
   determine, based on the sparse detection filter score, whether the material of interest or specific target is present in the subject scene pixel.

13. A tangible non-transitory computer-readable storage medium having computer readable instructions stored therein for selecting a subset of hyperspectral imaging scene spectral covariance matrix principal components to detect a material of interest or specific target in a scene, which when executed by one or more processors provided with a set of whitened principal component coefficients of a spectral reference vector, the spectral reference vector representative of a material of interest or specific target:
- compute a signal-to-clutter ratio (SCR) of the spectral reference vector based on the set of whitened principal component coefficients of the spectral reference vector;
- rank the contribution of each whitened principal component coefficient to the total SCR;
- select, based on rank, a subset of whitened principal component coefficients from the set of whitened principal component coefficients of the spectral reference vector; and
- for each of a plurality of scene pixels in the scene, compute a sparse detection filter score for a subject scene pixel based on the selected subset of whitened principal component coefficients of the spectral reference vector and a respective subset of whitened principal component coefficients of the subject scene pixel having the same indices; and
- determine, based on the sparse detection filter score, whether the material of interest or specific target is present in the subject scene pixel.

* * * * *